Aug. 25, 1959  P. H. BROWN  2,900,921
HYDRAULIC PUMPS AND MOTORS
Filed Feb. 25, 1957
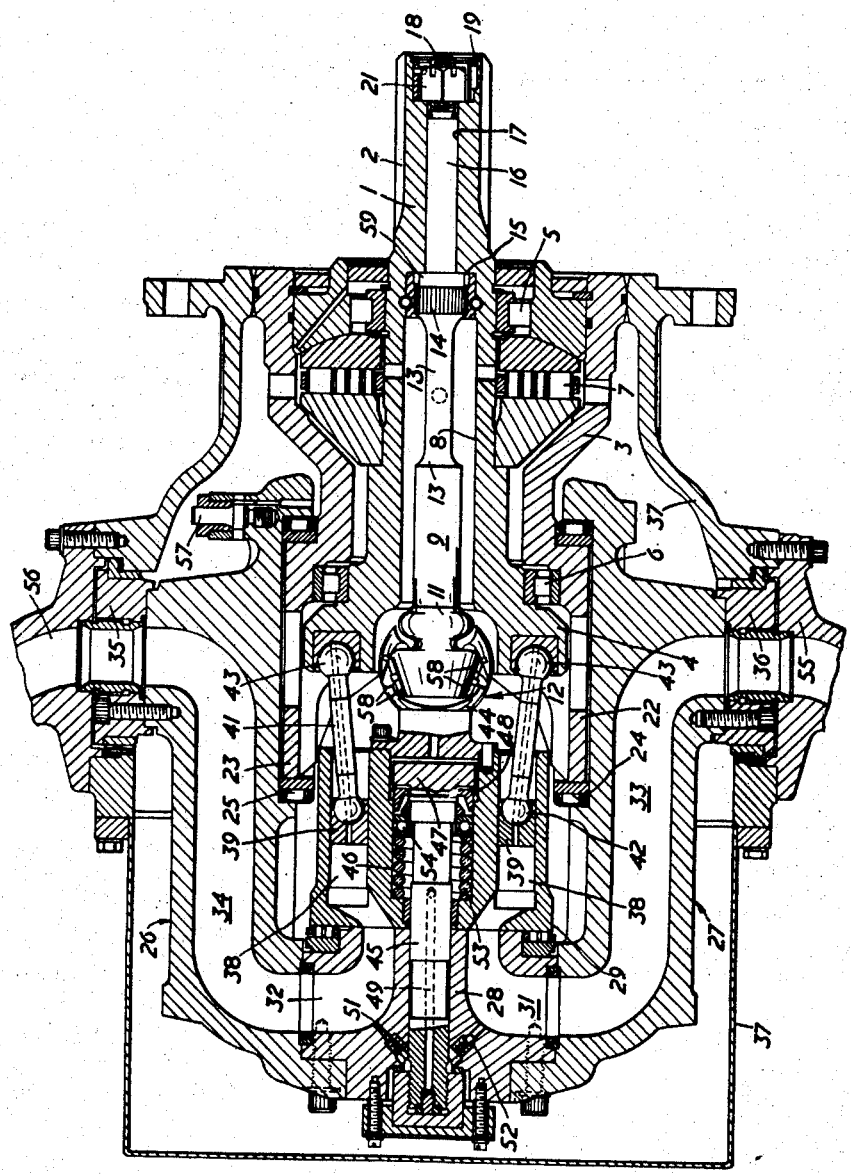
INVENTOR
PETER H. BROWN
BY
ATTORNEYS

United States Patent Office 2,900,921
Patented Aug. 25, 1959

2,900,921

HYDRAULIC PUMPS AND MOTORS

Peter H. Brown, Prestbury, England, assignor to Dowty Hydraulic Units Limited, and Oswald Thoma, both of Tewkesbury, England Application February 25, 1957, Serial No. 641,980

Claims priority, application Great Britain February 27, 1956

7 Claims. (Cl. 103—162)

This invention relates to hydraulic pumps or motors of the kind comprising a rotatably driven thrust plate element, a rotatable block element having a plurality of cylinders therein whose axes are parallel with or slightly inclined to the axis of rotation of the block, pistons in the cylinders, connecting rods drivingly connecting the thrust plate to the pistons, and connecting means to ensure that the block and thrust plate rotate together, the rotational axes of the cylinder block and thrust plate intersecting in the plane of the thrust plate. In a pump or motor of this kind, hereinafter referred to as a device of the character described, it is desirable that the connecting rods should be arranged so that reciprocating angular movement of each rod during rotation of the thrust plate and block takes place substantially only in a plane containing the rotational axis of the block, to reduce the torque exerted on the connecting means, and to keep the frictional losses to a minimum. This requires that the thrust plate and block be not relatively angularly displaced about their rotational axis from correct alignment, as hereinafter more fully explained. It is usual to interconnect drivingly the thrust plate and block by means of a universal joint arrangement if the angle between block and thrust plate axes is to be variable in order to vary piston stroke, or by means of bevel gears where this angle and piston stroke is fixed.

The object of this invention is to provide a pump or motor of the kind referred to, in which angular adjustment of the thrust plate relatively to the cylinder block may be made about their rotational axes after assembly, whereby accurate setting of the block relative to the thrust plate may be obtained to cause the connecting rods to move in the desired manner mentioned above but with less stringent manufacturing tolerances than heretofore.

In accordance with the present invention in a pump or motor of the kind referred to, the connecting means between the block element and the thrust plate element is retained in driving connection with one of these elements by locking means easily accessible externally of the pump or motor, whereby the two elements may be locked in their correct driving alignment after assembly.

It is preferred that the connecting means which ensure that the block and plate elements rotate together should be a constant velocity universal joint having a driving shaft extending to one side thereof which is capable of being locked to the thrust plate by means such as a screw means operable externally of the pump or motor. The driving shaft extending from the universal joint is preferably long and thin so that some spring deflection of the shaft is possible to correct for slight inaccuracies in positioning of the universal joint. The specific locking means illustrated includes a splined broach formed upon the driving shaft extension, engageable by screw-induced axial movement into a softer metal bush in the thrust plate element.

In order that the invention may be clearly understood, one embodiment thereof comprising a variable displacement pump will be described with reference to the accompanying drawing which shows the pump in cross-section.

In the drawing a driving shaft 1 of the pump is provided having splines 2 to facilitate positive connection to a driving means. This shaft extends into a housing 3 and increases in cross-section to terminate as the thrust plate 4. The driving shaft 1 and thrust plate 4 are made from a single piece of metal and are fixedly located by means such as the roller bearings 5 and 6 against radial movement and by the thrust roller bearing 7 against endwise movement. The shaft 1 and thrust plate 4 include a central bore 8 in which is located a shaft 9, constituting part of the connecting means referred to above, which extends to one half 11 of a universal joint 12. This universal joint is of a type known in the art as a constant-velocity universal joint, the function whereof is to maintain a constant rotational velocity of the driven element 29, with constant velocity of the driving element 4. The shaft 9 includes a portion 13 of reduced diameter to allow of small side deflections of the half 11 of the universal joint. The outer end of the shaft 13 is formed with a splined or serrated portion 14 which is of hardened metal, the ends of the serrations being sharp. The portion 14 is arranged to be drive fit in a comparatively soft metal bush 15 located at the end of the bore 8. A small diameter draw shaft 16 is integral with and extends from the portion 14 through a small diameter hole 17 in shaft 1, terminating adjacent the outer end of the shaft in a screw-threaded portion 18. A recess 19 in the outer end of shaft 1 accommodates a nut 21 in screw-threaded engagement with screw 18 such that rotation of the nut relatively to the draw shaft 16 will pull the latter to cause the portion 14 to enter the meal bush 15, moving from left to right.

The housing 3 extends on either side of the thrust plate 4 in the form of two circular discs 22 and 23. These discs are surrounded by roller bearings 24 and 25 which in turn fit into recesses formed in the ends of hollow arms 26 and 27, the arms 26 and 27 extend along the side of the cylinder block and are secured to a valve plate 28 on which the cylinder block 29 rotates. The valve plate includes two ports 31 and 32 which connect to passages 33 and 34 which extend through the hollow arms 27 and 26 respectively. The opposite ends of the hollow arms are located in bearings respectively 35 and 36 formed in the pump casing 37, these two bearings being arranged to lie co-axially with the roller bearings 24 and 25 and with the geometric centre of universal joint 12.

A plurality of cylinders 38 are formed in the cylinder block 29 arranged symmetrically in the block with their axes parallel to the axis of block rotation. In each cylinder a piston 39 is slidably located and from each piston a connecting rod 41 extends to the thrust plate. Each connecting rod is located in its respective piston by means of a ball end 42 whilst, at the same time, its opposite end is located in the thrust plate by means of a ball end 43. The block 29 is rotated by means of the universal joint 12 and that half 44 of the universal joint which cooperates with the half 11 is directly mounted on the end of the block 29 adjacent the thrust plate. The block is retained on the valve plate by means of a fixed shaft 45 extending from the valve plate through a central bore 46 in the block. The end of the shaft 45 is enlarged at 47 and forms a location for a sealing ring 48 which seals in the bore 46. A hole 49 extends along the shaft 45 and supplies liquid under pressure into the bore 46 which then acts to urge the block on to the valve plate. Pressure liquid obtains access to the hole 49 through one or the other of two one-way valves 51 or 52 located respectively in the ports 32 and 31. A compression spring 53 located in the bore 46 acts through a thrust bearing 54 against the enlarged end 47 or shaft 45 also to urge the block against the valve plate.

The passages 33 and 34 extend through bearings 36 and 35 to fixed pipes 55 and 56 by which supply and return liquid may enter and leave the pump. The cylinder block 29, valve plate 28, and arms 26, 27 form a complete assembly which is movable about the common axis of the bearings 24, 25, 35, and 36 to vary the angular position about this axis of the thrust plate relatively to the cylinder block and so to vary pump displacement. This angular position is controlled by means of a screw adjustment (not shown but known in the art) manually adjustable from externally of the casing 37 and acting through a pin 57 secured to arm 26.

The general kind of pump as described is well-known and its operation to vary displacement by angular adjustment of the cylinder block assembly about the common axis of bearings 24, 25, 35 and 36 is well known. The present invention, however, is concerned with a more simple method of manufacture and assembly of such a pump. This more simple method of manufacture and assembly is concerned particularly with the means by which the half 11 of universal joint 12 may be locked to the thrust plate 4 after complete assembly of the pump whereby correct relative positions of thrust plate and cylinder block about the axis of rotation of the cylinder block 29 may be obtained to enable the connecting rods 41 to act as directly as possible, i.e. to be arranged so that angular reciprocation of these rods which must take place is substantially in planes passing through the axis of rotation of the cylinder block. The universal joint 12 shown is of a comparatively new form. Briefly, the two halves 11 and 44 of this universal joint are each of U-shape, the limbs interengaging one with the other through the medium of a plurality of pads 58 semi-cylindrical in shape which are arranged to rock on the limbs and slidingly engage one another. This form of universal joint gives a constant velocity drive between the two halves whilst, at the same time, it can allow considerable relative movement of the two halves of the joint along their rotational axes. In the pump embodiment as described the whole pump may be completely assembled with the shaft 9 and the half 11 of the universal joint displaced to the left from the position shown in the drawing so that the serrated portion 14 is in position to enter but has not entered the soft metal bush 15. The final operation in the assembly of the pump is to ensure that the cylinder block is correctly aligned relatively to the thrust plate before the nut 21 is tightened to pull the portion 14 into the bush 15, which action will fix the half 11 of the universal joint relatively to the thrust plate 4 and thus will locate the cylinder block relatively to the thrust plate. To facilitate this operation the edge of the cylinder block is index-marked at a position where it may be seen through a small hole suitably provided in the casing 37. A similar index mark is also provided on shaft 1 which may be seen externally of the pump. By arranging that the mark on the cylinder block is visible through the hole and is correctly positioned and that the mark on the shaft 1 is also correctly positioned the nut 21 is tightened to draw the serrated portion 18 into the bush 15. The limit of movement is determined by the engagement of the end 59 of the serrated portion 18 on the base of bore 8.

With the particular kind of universal joint described it is possible to employ the serrated portion 14 and bush 15 to effect the locking operation but, however, if a more usual universal joint is employed the portion 14 and bush 15 could still be used if a sliding joint were provided in the shaft 9. The invention is not limited to the interengagement of a serrated broach portion with a soft bush, but any other form of locking means which can lock the shaft 9 by relative axial movement in any position relatively to the shaft 1 may be employed, for example a tapered portion on shaft 9 may be arranged to engage in a tapered socket in the shaft 1 and be locked by a clamping or locking force produced by turning the nut 21. Still further the invention is not limited to the locking means being provided in the thrust plate portion of the pump. In other forms of pump or motor the half of the universal joint attached to the cylinder block might equally well be arranged for locking to the cylinder block after assembly of the pump.

When the pump is correctly adjusted in accordance with the invention and is in operation there is substantially no torque exerted on the universal joint to cause rotation of the cylinder block as compared with the driving torque which is exerted on the thrust plate. It will be appreciated that this result is obtained by the use of the invention without highly accurate machining. Because of machining tolerances and bearing clearances it can never be ensured that the rotation axes of the cylinder block and thrust plate will accurately intersect, and this would cause high stresses in the universal joint were it not for the provision of thin shaft 9 which allows slight transverse movement of the universal joint relatively to the thrust plate.

I claim as my invention:

1. In a device of the character described, a rotatable cylinder block element, formed with a plurality of cylinders whose axes are substantially parallel to the axis of rotation, a rotatably driven thrust plate element, the block element and the thrust plate element being so disposed in operation that their rotational axes intersect in the plane of the latter, a piston reciprocable in each cylinder, a connecting rod extending between and articulated with respect to each piston and the thrust plate element, means independent of said connecting rods interconnecting the cylinder block element and the thrust plate element for conjoint and like rotation, said means including a first portion secured to one such element and a complemental second portion for connection to the other such element, said latter element being preliminarily shiftable angularly about its rotative axis relative to said second portion, and means operatively connected to one of the second portion and the second element, reacting from the other, and accessible after the two elements have been mounted in the device to lock the shiftable second element to its second portion, following any relative rotation of the two to align the connecting rods in planes which include the axis of rotation of the block element.

2. A device of the character set forth in claim 1, wherein the interconnecting means between the elements comprises a constant velocity universal joint, one half whereof is secured to the block element and the other half whereof is locked by the locking means to the thrust plate element.

3. A device of the character set forth in claim 1, wherein the interconnecting means between the two elements is a universal joint, the portion thereof relative to which the one element is shiftable including a shaft extension formed with a splined head, and a soft bush carried by the corresponding element and lockingly engageable by said splined head by their relative axial movement, the externally accessible means being operatively connected to said splined head to shift the same axially of its shaft extension into locking engagement with said bush.

4. A device of the character set forth in claim 1, wherein the interconnecting means between the two elements is a constant velocity universal joint, one portion whereof is secured to the block element, an axially bored drive shaft extending axially from the thrust plate element, a shaft extension secured to the second half of the universal joint, extending through the drive shaft bore, and initially arranged for axial movement therein, said shaft extension being formed with a serrated head, a softer metal bush carried by the drive shaft, adjacent the initial position of said serrated head, the locking means including means to shift said serrated head and said bush relatively axially to engage them for driving the universal joint from the drive shaft, following any relative aligning rotation of the two elements.

5. A device of the character set forth in claim 2, including an axially bored rotary drive shaft extending from the thrust plate, and a flexible shaft extending from the corresponding portion of the universal joint, and secured by the locking means to the drive shaft at its distant end, by its flexibility allowing slight yielding in the event of inaccurate intersection of the axes of the two elements.

6. A device of the character set forth in claim 5, including complementally engageable shoulders formed on the shaft extension and the drive shaft, a draw shaft extending from the shaft extension to the outer end of the drive shaft bore, and screw threaded means reacting between the drive shaft and said draw shaft to clamp said shoulders together, to fix the drive shaft and shaft extension against relative angular movement.

7. A device of the character set forth in claim 6, including serrations formed on the shaft extension and a softer metal bush fixed to the drive shaft, the two being interengageable by the axial shifting of the draw shaft relative to the drive shaft under the influence of said screw threaded means.

References Cited in the file of this patent

FOREIGN PATENTS

| | | |
|---|---|---|
| 471,291 | Germany | Feb. 9, 1929 |
| 860,429 | France | Sept. 22, 1939 |